(12) United States Patent
Agrawal et al.

(10) Patent No.: US 9,912,563 B2
(45) Date of Patent: Mar. 6, 2018

(54) TRAFFIC ENGINEERING OF CLOUD SERVICES

(71) Applicant: International Business Machines Corporation, Armonk, NY (US)

(72) Inventors: Dakshi Agrawal, Monsey, NY (US); William Cornejo, Queens, NY (US); Thai V. Le, White Plains, NY (US); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 14/337,442

(22) Filed: Jul. 22, 2014

(65) Prior Publication Data
US 2016/0028834 A1    Jan. 28, 2016

(51) Int. Cl.
G06F 15/16 (2006.01)
*H04L 12/26* (2006.01)
*H04L 29/08* (2006.01)

(52) U.S. Cl.
CPC ............ *H04L 43/087* (2013.01); *H04L 67/10* (2013.01)

(58) Field of Classification Search
CPC ......... H04L 67/16; H04L 67/10; H04L 43/08; H04L 43/087
USPC ......................................... 709/224–245, 232
See application file for complete search history.

(56) References Cited

U.S. PATENT DOCUMENTS

| | | | | |
|---|---|---|---|---|
| 7,769,884 | B2* | 8/2010 | Acharya | H04L 12/2856 709/223 |
| 2002/0013844 | A1* | 1/2002 | Garrett | H04L 12/2801 709/225 |
| 2002/0141386 | A1* | 10/2002 | Minert | H04M 7/066 370/352 |
| 2003/0220769 | A1* | 11/2003 | Delegue | H04L 12/24 702/188 |
| 2007/0223922 | A1* | 9/2007 | Nakata | H04J 3/1611 398/52 |
| 2009/0248865 | A1* | 10/2009 | Kodama | G06F 9/505 709/224 |
| 2011/0231498 | A1* | 9/2011 | Tovar | G06Q 10/107 709/206 |

(Continued)

FOREIGN PATENT DOCUMENTS

EP    2385660 A1    9/2011

OTHER PUBLICATIONS

Wang et al., "Open Flow-Based Server Load Balancing Gone Wild", Hot-ICE'11, Proceedings of the 11th USENIX conference on hot topics in management of internet cloud, and enterprise networks and services, 2011; 6 pgs.

*Primary Examiner* — David Lazaro
*Assistant Examiner* — Berhanu Shitayewoldetsadi
(74) *Attorney, Agent, or Firm* — Cantor Colburn LLP; Rabin Bhattacharya

(57) ABSTRACT

Traffic engineering of cloud services include receiving, by an enterprise network agent of an enterprise network, a policy from an operator of the enterprise network and transmitting, by a processor, the policy to a cloud service provider. Aspects also include monitoring an incoming traffic to the enterprise network from the cloud service provider and collecting data regarding the incoming traffic and transmitting collected data regarding the incoming traffic to the cloud service provider.

14 Claims, 7 Drawing Sheets

(56) References Cited

U.S. PATENT DOCUMENTS

| | | |
|---|---|---|
| 2011/0282986 A1 | 11/2011 | Phaal |
| 2011/0289134 A1* | 11/2011 | de los Reyes .......... H04L 63/20 709/203 |
| 2012/0005724 A1* | 1/2012 | Lee ..................... H04L 63/0209 726/1 |
| 2012/0066487 A1 | 3/2012 | Brown et al. |
| 2012/0151057 A1* | 6/2012 | Paredes ............... H04L 12/4641 709/225 |
| 2013/0128746 A1 | 5/2013 | Yedavalli |
| 2013/0182574 A1 | 7/2013 | So et al. |
| 2014/0126374 A1* | 5/2014 | Wang .................. H04L 67/1029 370/235 |
| 2014/0173089 A1* | 6/2014 | Li ....................... H04L 67/1097 709/224 |
| 2015/0029846 A1* | 1/2015 | Liou .................... H04L 47/122 370/230.1 |

\* cited by examiner

TRAFFIC ENGINEERING OF CLOUD SERVICES

BACKGROUND

The present invention relates to provisioning of cloud services, and more specifically, to traffic engineering of cloud services.

In general, cloud computing refers to server-based computing that allows users to interact with server resources using a variety of devices.

Recently, more and more enterprises are moving their existing services from their enterprise networks to cloud based networks and relying on cloud based networks for new services. As a result, enterprise networks are experiencing increasing incoming network traffic from the cloud based networks and the ability to control incoming traffic has become important. However, existing systems do not provide operators of enterprise networks with the ability to sufficiently control incoming traffic from cloud based networks. Rather, the cloud based networks are generally in control of the rate and manner in which data is sent from the cloud based network to the enterprise networks. Operators currently use ad-hoc solutions based on the Border Gateway Protocol (BGP) to control incoming traffic. However, this protocol was not designed for this purposes, and current solutions are therefore error-prone, vulnerable to instabilities and with unpredictable outcomes.

SUMMARY

According to exemplary embodiments, methods, computer program products and processing systems for traffic engineering of cloud services include receiving, by an enterprise network agent of an enterprise network, a policy from an operator of the enterprise network and transmitting, by a processor, the policy to a cloud service provider. Aspects also include monitoring an incoming traffic to the enterprise network from the cloud service provider and collecting data regarding the incoming traffic and transmitting collected data regarding the incoming traffic to the cloud service provider.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Providing operators of enterprise networks with the ability to load balance incoming traffic across border routers of the enterprise network will lower transit costs, avoid congestion, offer better performances for some applications/some users, and allow the enterprise network to withstand surges in traffic. In exemplary embodiments, systems, methods and computer program products are provided to control incoming network traffic from a cloud service provider through multiple ingress points of an enterprise network. In exemplary embodiment, an enterprise network agent disposed in the enterprise network is used to determine a policy for splitting incoming network traffic across multiple ingress points and forwards the policy to a cloud agent in the cloud service provider. In exemplary embodiments, a cloud agent disposed in the cloud executes the policy for traffic sent from the cloud service provider to the enterprise network.

Figure 1:
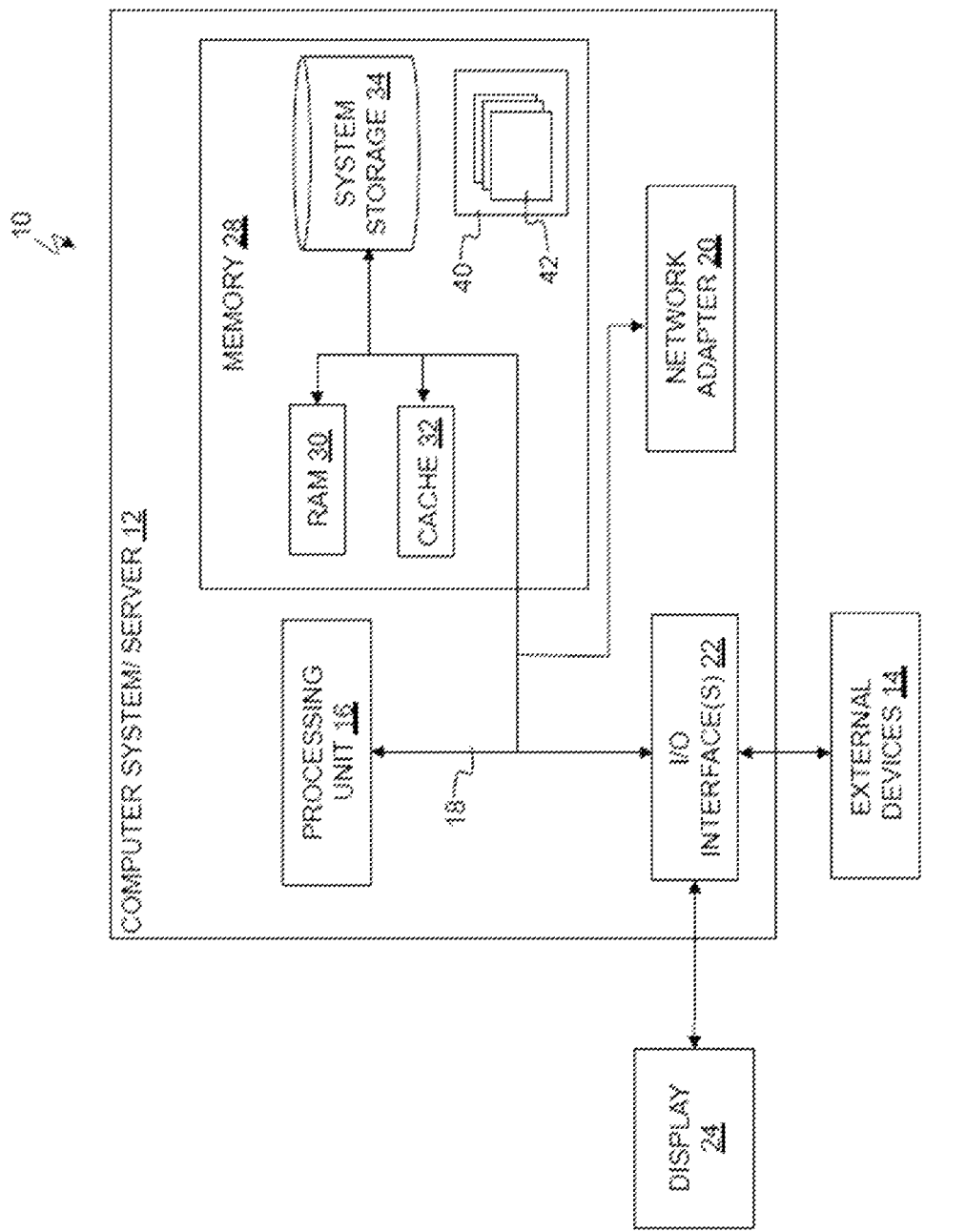
FIG. 1 illustrates a schematic of an example of a cloud computing node in accordance with exemplary embodiments.

Referring now to FIG. 1, FIG. 1 illustrates a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
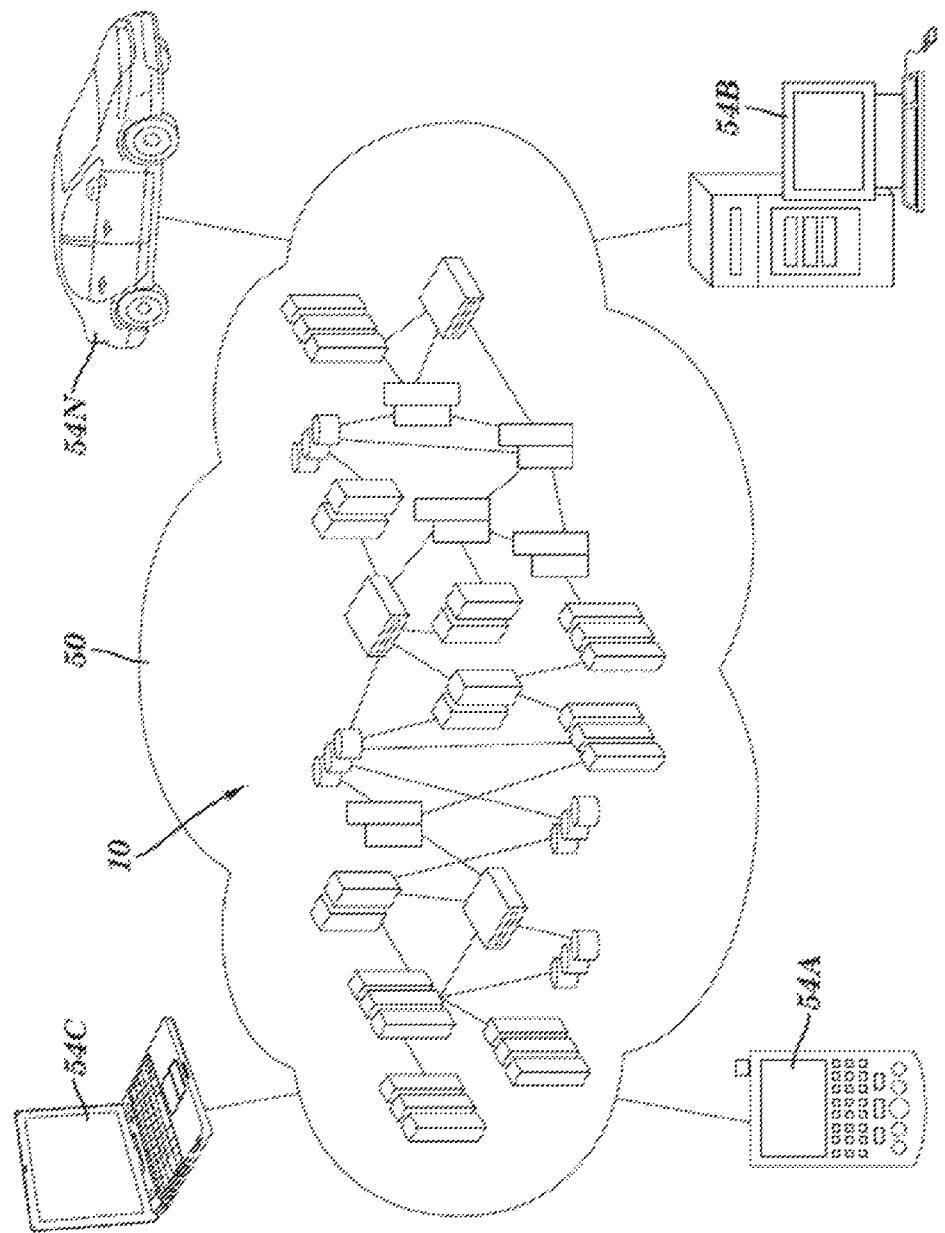
FIG. 2 illustrates a cloud computing environment in accordance with exemplary embodiments.

Referring now to FIG. 2, FIG. 2 illustrates a cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
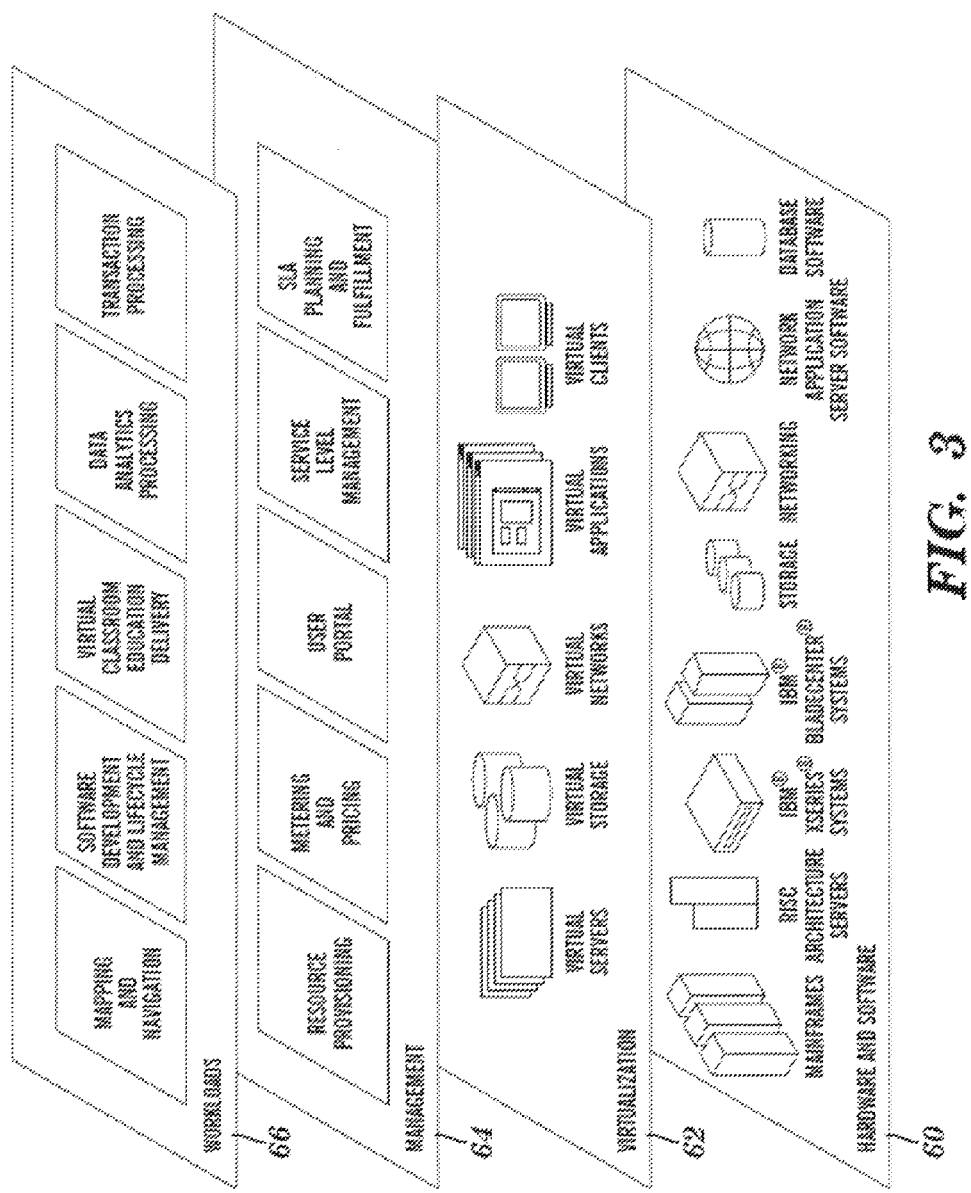
FIG. 3 illustrates a set of functional abstraction layers provided by a cloud computing environment in accordance with exemplary embodiments.

Referring now to FIG. 3, FIG. 3 illustrates a set of functional abstraction layers provided by cloud computing environment 50 (shown in FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM® pSeries® systems; IBM® xSeries® systems; IBM® BladeCenter® systems; storage devices; networks and networking components. Examples of software components include network application server software, in one example IBM® WebSphere® application server software; and database software, in one example IBM® DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides prearrangement for, and procurement of, cloud computing resources for which a future requirement is anticipated in accordance with an SLA. The management layer 64 also includes a forecasting-based service assignment module.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing. Further, other types of workloads may also include web service workloads, enterprise applications such as billing and customer relationship management, various banking and finance applications, etc.

Figure 4:
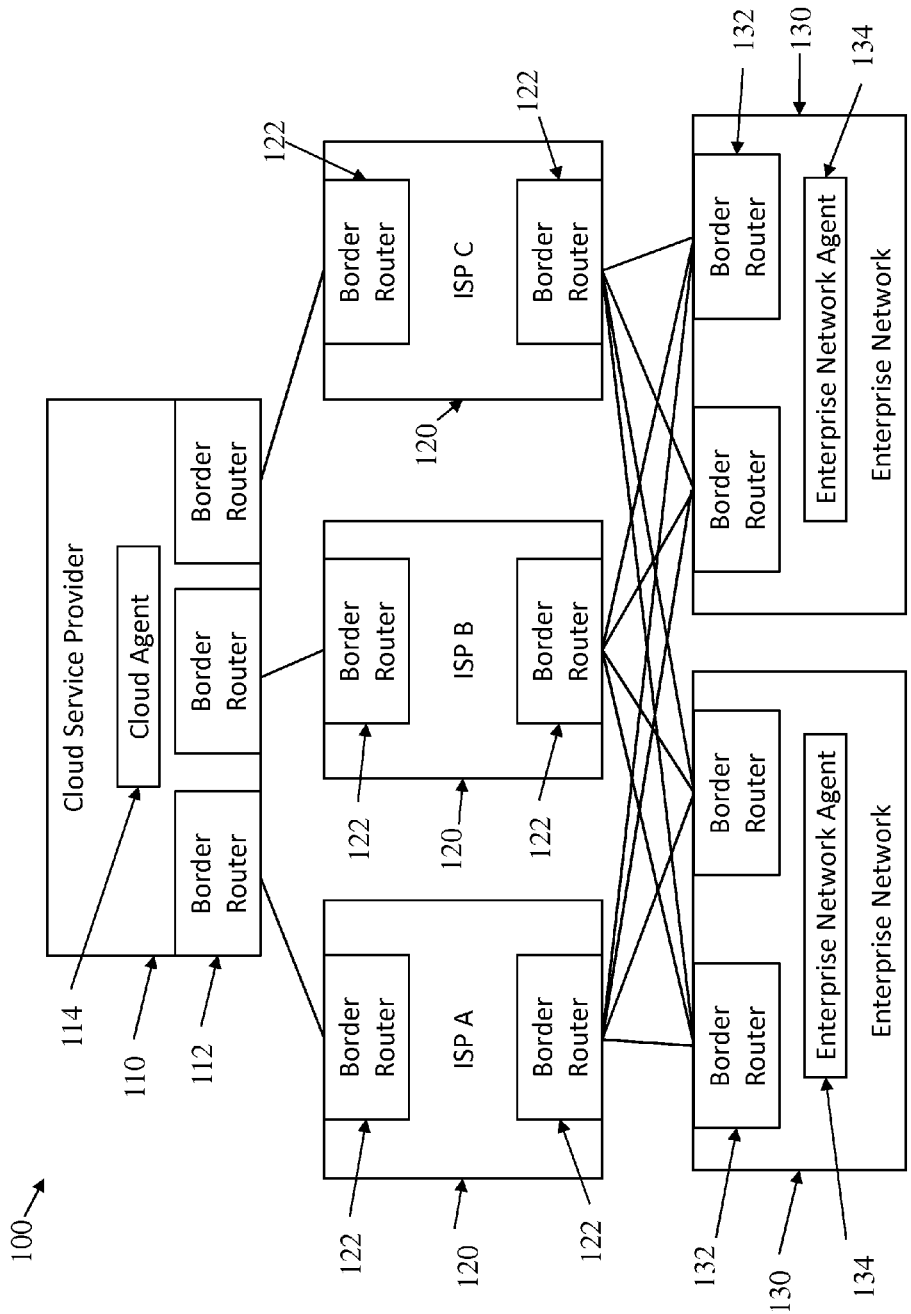
FIG. 4 illustrates a block diagram of a system for traffic engineering of cloud services in accordance with an exemplary embodiment.

Referring now to FIG. 4, a system 100 that includes a cloud service provider (CSP) 110, one or more internet service providers (ISP) 120 and one or more enterprise networks 130 is shown. As illustrated, each of the enterprise networks 130 include a plurality of border routers 132 which are used to communicate with a border router 122 of the one or more internet service providers 120. Likewise, the cloud service provider 110 includes a plurality of border routers 112 which are used to communicate with a border router 122 of the one or more internet service providers 120.

In exemplary embodiments, an enterprise network agent 134 is disposed in each of the enterprise networks 130. The enterprise network agent 134 is used to determine a policy for splitting incoming network traffic across multiple internet service providers 120 and forwards the policy to a cloud agent in the cloud service provider 110. In exemplary embodiments, the policy is set by an operator of the enterprise network 130 and the policy may be used to achieve a variety of goals. For example, the policy may be set to minimize maximum link utilization (i.e., load balancing), minimize ratio load to capacity, minimize transit costs, or to offer differentiated services. In exemplary embodiments, the enterprise network agent 134 measure throughputs, delay, jitter of the various communication paths between the cloud service provider 110 and the enterprise network 130. Based on these measurements and the policy, the enterprise network agent 134 can select optimal paths for the different applications (e.g., streaming video vs. backup).

In exemplary embodiments, a cloud agent 114 is disposed in the cloud service provider 110. The cloud agent 114 receives a policy from the enterprise network agent 134 of each of the one or more enterprise networks 130 and executes the policy for traffic sent from the cloud service provider 110 to the each of the one or more enterprise networks 130. In exemplary embodiments, the cloud agent 114 may execute the policy by instrumenting routing tables to control the traffic sent to the enterprise networks 130 over each of the internet service providers 120.

In exemplary embodiments, the cloud agent 114 and the enterprise networks agent 134 collect information from the border routers 112, 132, respectively. In one embodiment, the cloud agent 114 and the enterprise networks agent 134 communicate through a control protocol to set up tunnels between the border routers 112 of the cloud service provider 110 and the border routers 132 of the enterprise network 130. The control protocol is used to direct different sets of flows over different internet service providers 120 to ensure that the cloud service provider 110 complies with the policy received from the enterprise networks agent 134.

In exemplary embodiments, the cloud agent 114 and the enterprise networks agent 134 may also allow operators of the enterprise network 130 to satisfy quality of service (QoS) requirements, such as delay, throughput, etc. One or both of the cloud agent 114 and the enterprise networks agent 134 may periodically send probes through various internet service providers 120 to test the network conditions. Based on the information received from probing the network conditions, the cloud agent 114 may redirect one or more data flows to ensure the QoS requirements of the enterprise networks agent 134 are satisfied.

In exemplary embodiments, the cloud service provider 110 may include multiple data centers that are located in different geographic locations. In these embodiments, the cloud agent 114 may be configured to select which of the data centers will be used to service the customer, and to perform traffic engineering across the data centers and the customer networks.

Figure 5:
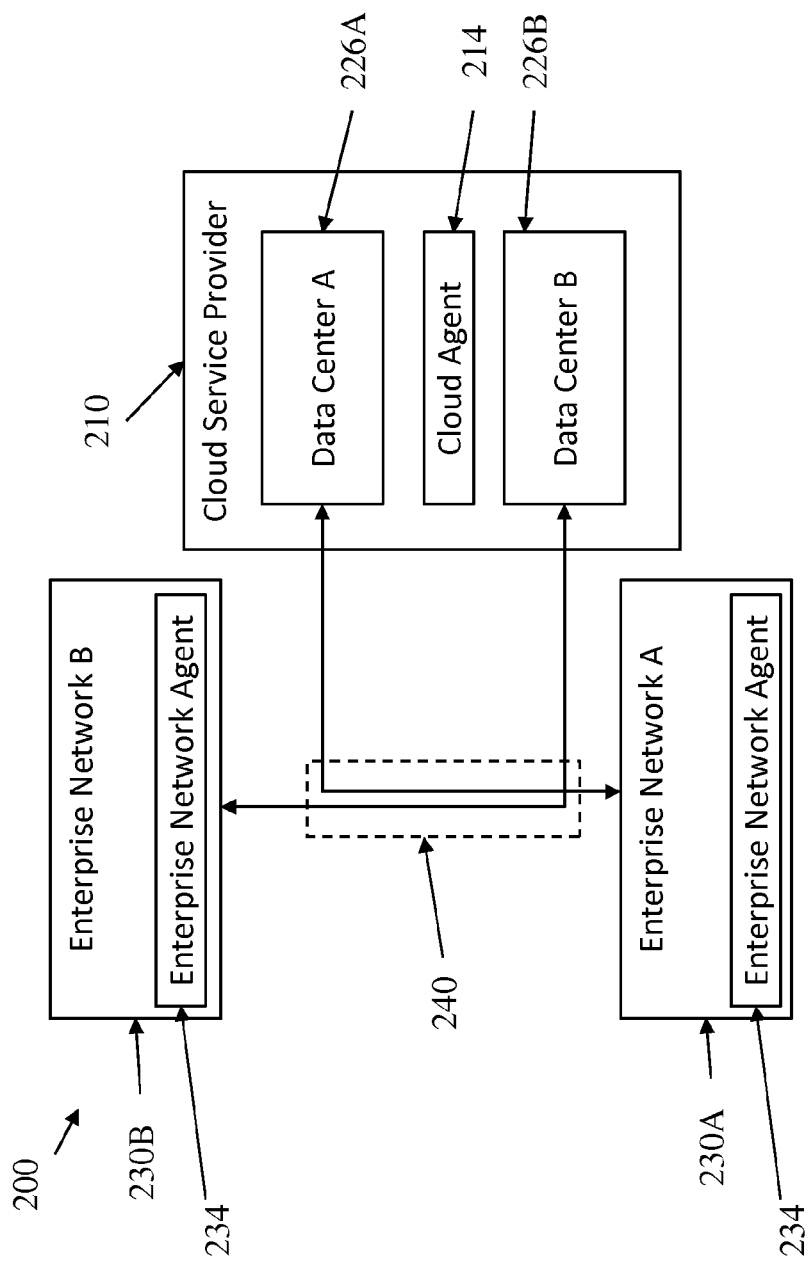
FIG. 5 illustrates a block diagram of a system for traffic engineering of cloud services in accordance with an exemplary embodiment.

Referring now to FIG. 5, a system 200 that includes two enterprise networks 230A, 230B and a cloud service provider 210 consisting of two data centers 226A, 226B is shown. Enterprise network 230A is being served by data center 226A while enterprise network 230B is being served by data center 226A. As illustrated, the data paths from enterprise network 230A to data center 226A and from enterprise network 230B and data center 226B share a common portion 240 which can cause congestion and result in degraded performances. In exemplary embodiments, one or both of the cloud agent 214 and the enterprise networks agent 234 may detect congestion on the common portion 240 of the data path. In response to detecting such a condition, the cloud agent 214 and the enterprise networks agent 234 may redirect the data flow from enterprise network 230A to data center 226B and the data flow from enterprise network 230B to data center 226A, thereby eliminating the congestion problem.

Continuing now with reference to FIG. 4, in one embodiment an operator of an enterprise network 130 prefers to load balance the incoming traffic across ISP 120A, ISP 120B and ISP 120C. To achieve it, the operator would use the enterprise networks agent 134 to specify a policy for a ⅓ of incoming all incoming traffic to be from ISP 120A, ISP 120B, and ISP 120C, which would be communicated to the cloud agent 114.

In exemplary embodiments, the cloud agent 114 agent may setup tunnels between the border routers 112 and those of the enterprise network 130, and redirect different flows into those tunnels to achieve the desired policy. In addition, the cloud agent 114 and the enterprise networks agent 134 may dynamically redirect data flows to adjust to changes in the existing traffic. In exemplary embodiments, to redirect specific flows for one enterprise network 130 through specific ISPs 120 but not others, the tunnels could be targeted to specific IP prefixes. For example, assuming that the enterprise network has the block 101.1/20 of IP addresses, a tunnel from the border router 112 to border router 132 could be created for 10.1.1/24, while a different tunnel from the border router 112 to border router 132 could be created for 10.1.2/24.

In exemplary embodiments, the operator of the enterprise network may have a variety of reasons for wanting to control the amount and type of traffic sent by the cloud service provider over each of the various internet service providers. For example, the cost of using the various internet service providers may be different and the operator may want to only use a higher cost internet service provider for high value data transmissions. Likewise, the performance characteristics of the internet service providers may be different, either statically or dynamically. For example, one of the internet service providers may provide a fixed bandwidth connection while another provides a connection that has a variably bandwidth. Accordingly, the operator may set a policy that can dynamically react to the actual network conditions and achieve the goals set by the operator.

Figure 6:
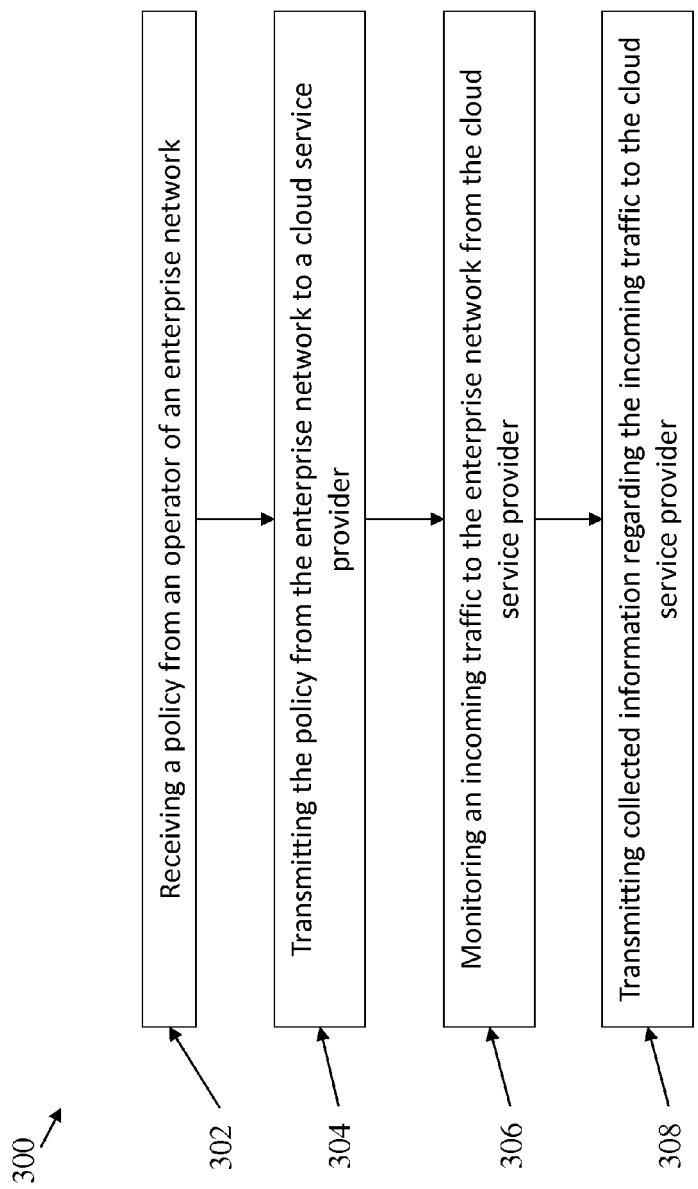
FIG. 6 illustrates a flowchart illustrating a method for traffic engineering of cloud services in accordance with an exemplary embodiment.

Referring now to FIG. 6, a flow chart illustrating an exemplary method 300 for traffic engineering of cloud services is illustrated. The method 300 includes receiving a policy from an operator of an enterprise network, as shown at block 302. In exemplary embodiments, the policy includes one or more rules that govern the transmission of data from a cloud service provider to the enterprise network. Next, as shown at block 304, the method 300 includes transmitting the policy from the enterprise network to the cloud service provider. In exemplary embodiments, an enterprise network agent is configured to receive the policy from the operator and to transmit it to the cloud service provider. The method 300 also includes monitoring the incoming traffic to the enterprise network from the cloud service provider and collecting data regarding the incoming traffic, as shown at block 306. In exemplary embodiments, the collected data may reflect the bandwidth, latency, jitter, or other characteristics of the data transmission path that the incoming traffic was transmitted over. Next, as shown at block 308, the method 300 includes transmitting the collected data regarding the incoming traffic to the cloud service provider. In exemplary embodiments, the cloud service provider may use the collected data to modify its transmission of data to the enterprise network to achieve one or more rules set forth in the policy. In another embodiment, the enterprise network may update its policy based on the collected data and transmit the updated policy to the cloud service provider.

Figure 7:
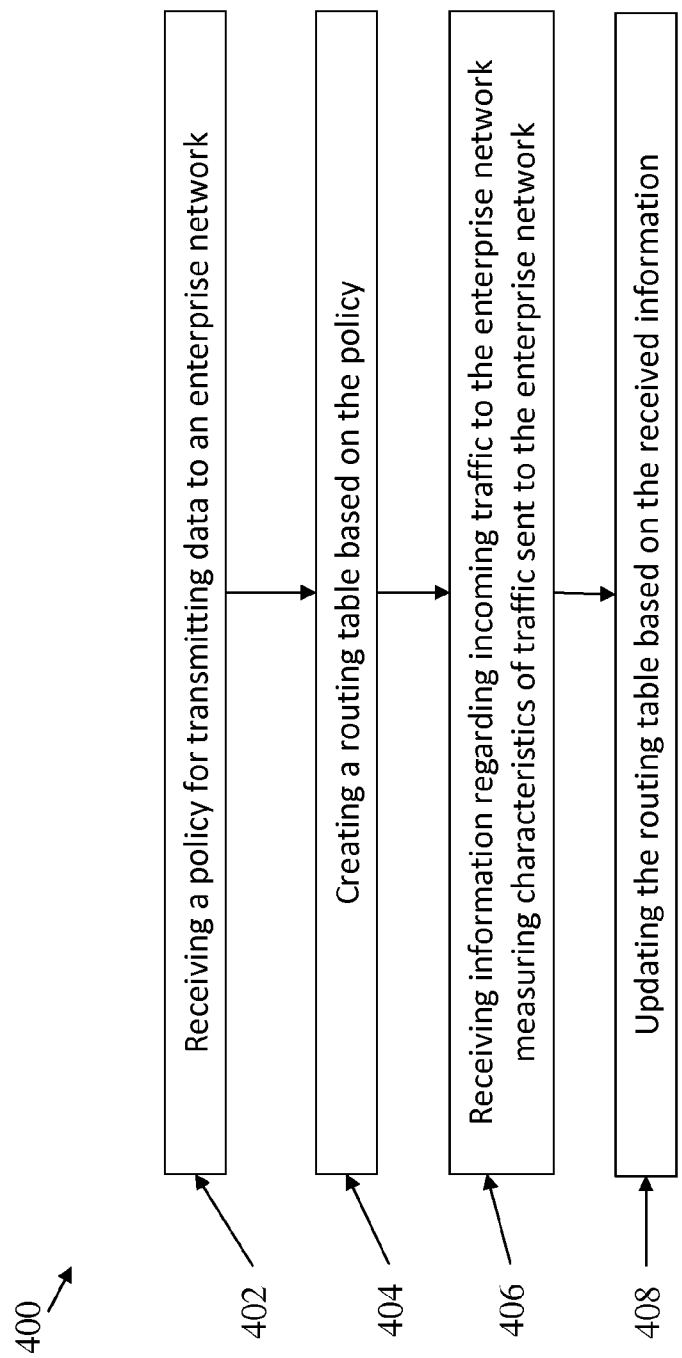
FIG. 7 illustrates a flowchart illustrating a method for traffic engineering of cloud services in accordance with an exemplary embodiment.

Referring now to FIG. 7, a flow chart illustrating an exemplary method 400 for traffic engineering of cloud services is illustrated. The method 400 includes receiving a policy from an enterprise network, as shown at block 402. In exemplary embodiments, the policy includes one or more rules that govern the transmission of data from the cloud service provider to the enterprise network. Next, as shown at block 404, the method 400 includes creating a routing table based on the policy. In exemplary embodiments, a cloud agent is configured to receive the policy from the enterprise network and to create a routing table based on the policy. The method 400 also includes receiving data from the enterprise network regarding incoming traffic to the enterprise network and measuring characteristics of traffic sent to the enterprise network, as shown at block 406. In exemplary embodiments, the collected data may reflect the bandwidth, latency, jitter, or other characteristics of the data transmission path that the incoming traffic was transmitted over. In other words, the cloud service provider could also measure properties (e.g., loss, delay, throughput, jitter) of the traffic sent to the enterprise networks over the different available paths, and later update the routing table based on such information. Next, as shown at block 408, the method 400 includes updating the routing table based on the received data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for traffic engineering of cloud services comprises: receiving, by an enterprise network agent of an enterprise network, a policy from an operator of the enterprise network; transmitting, by a processor, the policy to a cloud service provider, wherein the enterprise network includes a plurality of border routers that are configured to communicate with the cloud service provider via at least two internet service providers; monitoring an incoming traffic to the enterprise network from the cloud service provider and collecting data regarding the incoming traffic; and transmitting, by the processor, collected data regarding the incoming traffic to the cloud service provider, wherein the policy includes a desired distribution of the incoming traffic to the enterprise network among the plurality of border routers and among the at least two internet service providers and quality of service requirements for each communications channel from the cloud service provider to the enterprise network, and wherein the desired distribution is configured to minimize a maximum link utilization for each communications channel from the cloud service provider to the enterprise network, minimize a ratio load to capacity for each communications channel from the cloud service provider to the enterprise network or to minimize transit costs from the cloud service provider to the enterprise network.

2. The method of claim 1, wherein the policy includes one or more rules that govern the transmission of data from the cloud service provider to the enterprise network.

3. The method of claim 1, wherein the collected data includes at least one or more of the following a bandwidth, a latency and a jitter of a data transmission path that the incoming traffic was transmitted over.

4. The method of claim 1, wherein a transmission cost is associated with incoming traffic over each of the at least two internet service providers and wherein the transmission cost of the at least two internet service providers are different.

5. The method of claim 1, further comprising updating the policy based on the collected data and transmitting the updated policy to the cloud service provider.

6. A computer program product for traffic engineering of cloud services, the computer program product comprising: a non-transitory storage medium readable by a processing circuit and storing instructions for execution by the processing circuit for performing a method comprising: receiving, by an enterprise network agent of an enterprise network, a policy from an operator of the enterprise network; transmitting the policy to a cloud service provider, wherein the enterprise network includes a plurality of border routers that are configured to communicate with the cloud service provider via at least two internet service providers; monitoring an incoming traffic to the enterprise network from the cloud service provider and collecting data regarding the incoming traffic; and transmitting collected data regarding the incoming traffic to the cloud service provider, wherein the policy includes a desired distribution of the incoming traffic to the enterprise network among the plurality of border routers and among the at least two internet service providers and quality of service requirements for each communications channel from the cloud service provider to the enterprise network, and wherein the desired distribution is configured to minimize a maximum link utilization for each communications channel from the cloud service provider to the enterprise network, minimize a ratio load to capacity for each communications channel from the cloud service provider to the enterprise network or to minimize transit costs from the cloud service provider to the enterprise network.

7. The computer program product of claim 6, wherein the policy includes one or more rules that govern the transmission of data from the cloud service provider to the enterprise network.

8. The computer program product of claim 6, wherein the collected data includes at least one or more of the following a bandwidth, a latency and a jitter of a data transmission path that the incoming traffic was transmitted over.

9. The computer program product of claim 6, wherein a transmission cost is associated with incoming traffic over each of the at least two internet service providers and wherein the transmission cost of the at least two internet service providers are different.

10. The computer program product of claim 6, wherein the method further comprises updating the policy based on the collected data and transmitting the updated policy to the cloud service provider.

11. A processing system for traffic engineering of cloud services, the processing system comprising: a processor coupled with a memory, wherein the processor is in communication with a storage device and a network adapter, the processing system configured to perform a method comprising: receiving a policy from an operator of an enterprise network; transmitting the policy to a cloud service provider, wherein the enterprise network includes a plurality of border routers that are configured to communicate with the cloud service provider via at least two internet service providers; monitoring an incoming traffic to the enterprise network from the cloud service provider and collecting data regarding the incoming traffic; and transmitting collected data regarding the incoming traffic to the cloud service provider, wherein the policy includes a desired distribution of the incoming traffic to the enterprise network among the plurality of border routers and among the at least two internet service providers and quality of service requirements for each communications channel from the cloud service provider to the enterprise network, and wherein the desired distribution is configured to minimize a maximum link utilization for each communications channel from the cloud service provider to the enterprise network, minimize a ratio load to capacity for each communications channel from the cloud service provider to the enterprise network or to minimize transit costs from the cloud service provider to the enterprise network.

12. The processing system of claim 11, wherein the policy includes one or more rules that govern the transmission of data from the cloud service provider to the enterprise network.

13. The processing system of claim 11, wherein the collected data includes at least one or more of the following a bandwidth, a latency and a jitter of a data transmission path that the incoming traffic was transmitted over.

14. The processing system of claim 11, wherein a transmission cost is associated with incoming traffic over each of the at least two internet service providers and wherein the transmission cost of the at least two internet service providers are different.

* * * * *